Patented Mar. 13, 1923.

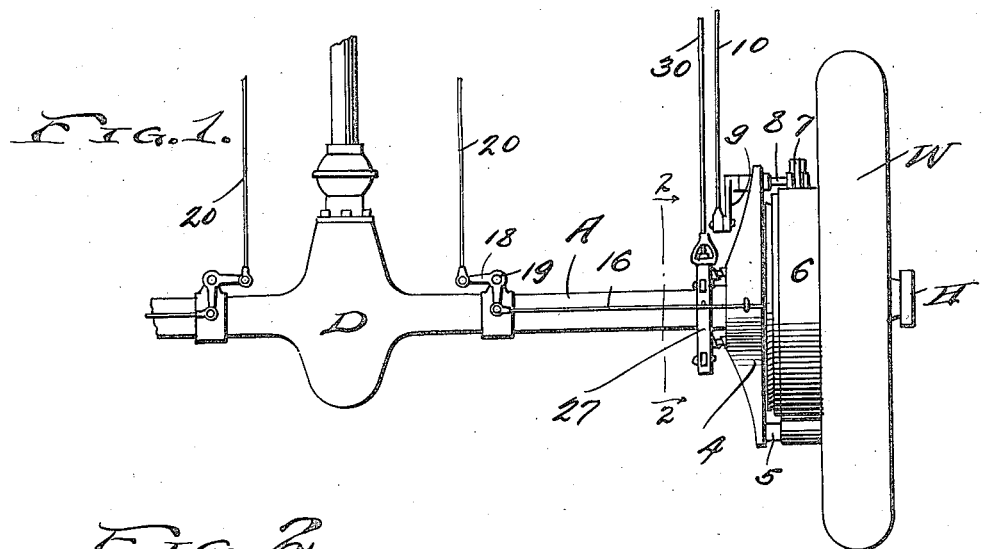
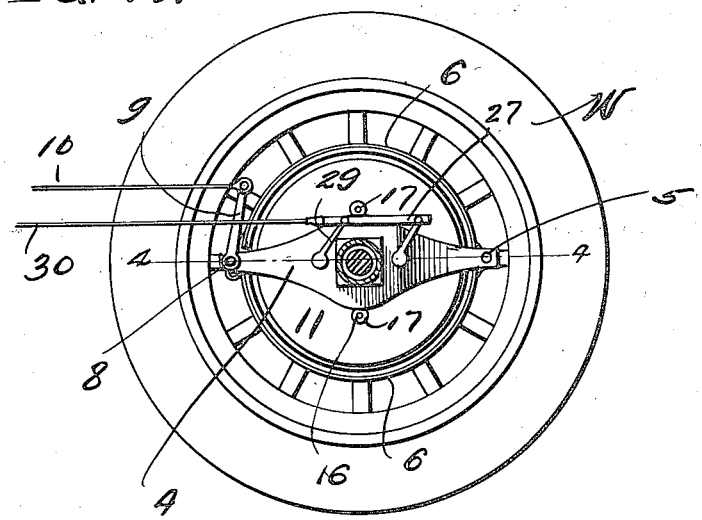
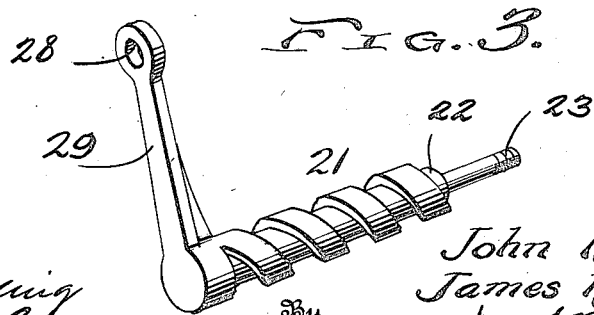

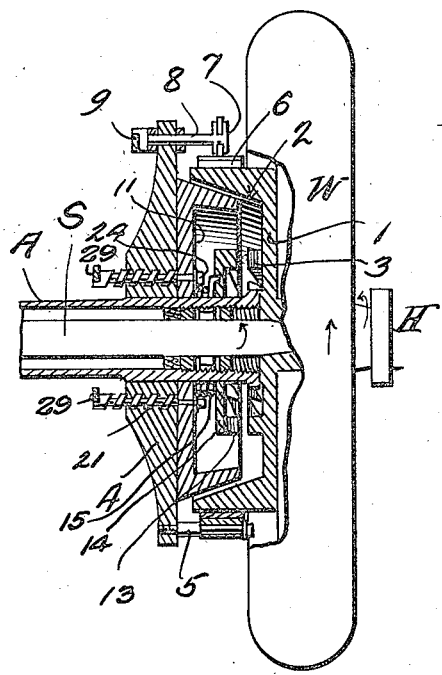
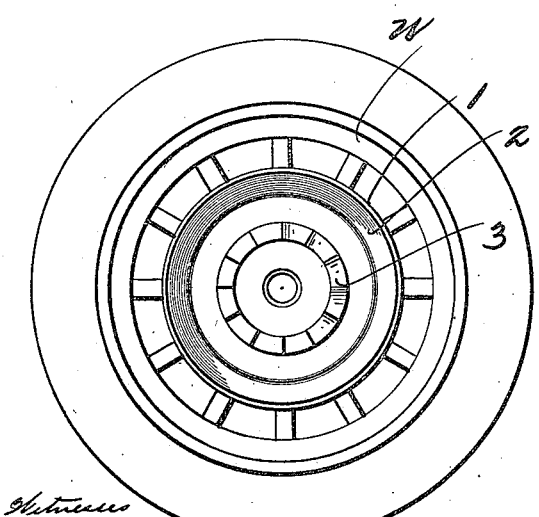
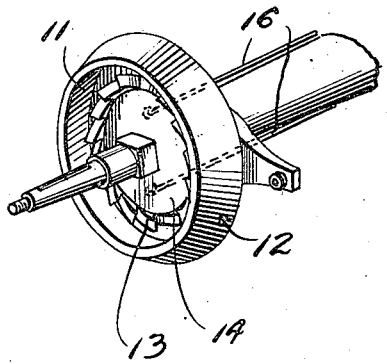

1,448,095

UNITED STATES PATENT OFFICE.

JOHN R. STEELE AND JAMES R. STANGER, OF IONA, IDAHO, ASSIGNORS TO UNIVERSAL SAFETY BRAKE COMPANY, OF IDAHO FALLS, IDAHO.

BRAKE.

Application filed February 7, 1919. Serial No. 275,642.

*To all whom it may concern:*

Be it known that we, JOHN R. STEELE and JAMES R. STANGER, citizen of the United States, residing at Iona, in the county of Bonneville and State of Idaho, have invented certain new and useful Improvements in Brakes, of which the following is a specification.

This invention relates to motor vehicles, and more especially to the brakes thereof; and the object of the same is to improve the construction of the brake while leaving the wheel free to be removed.

Another object is to provide the brake with a brake lock which will absolutely check rotation of the wheel when thrown into action.

Other objects will be set forth in the following specification and claims. Referring to the drawings—

Figure 1 is a plan view showing the arrangement of parts at one end of the rear or driving axle.

Figure 2 is a section on the line 2—2 of Figure 1.

Figure 3 is a perspective detail to be referred to hereinafter

Figure 4 is a horizontal section on the line 4—4 of Figure 2.

Figure 5 is an inside elevation of the wheel removed.

Figure 6 is a detail perspective view of a portion of the brake mechanism.

Within the casing A of the rear axle are mounted the axle spindles S connected at their inner ends by a differential within the casing D as usual, and each having a wheel W secured on its outer end through its hub H in a well known manner. No novelty is claimed for these parts. We will add here that the operating rods lead forward to levers or pedals within reach of the driver which are not shown and need no further description.

Coming now to the details of the present invention, a drum 1 is secured upon the hub H at the inside of the driving wheel W, its inner wall 2 tapering toward the wheel, and fast within this drum is a ring of teeth 3. A yoke 4 is mounted rigidly on the axle casing A and stands horizontal as seen in Figure 2. To a pin 5 in the rear arm of this yoke are connected the two leaves 6 of a band brake which pass around the periphery of the drum and have their forward ends connected with the T-head 7 of a crank shaft 8 rotatably mounted in the front end of the yoke, its crank 9 being capable of manipulation by a rod or wire 10 which leads forward to a suitable lever or pedal such as referred to above. This is the ordinary service brake easily applied and with relative gentle force to retard the rotation of the wheel W. It is obvious that the wheel can be removed and the drum drawn out of the two leaves of this band brake without interfering with the position of parts in the least.

Disposed next outside the yoke and slidably mounted on the axle casing is a hollow cone 11 whose face 12 is of the same taper as the inner wall 2 of the drum, and within this cone and also slidably mounted on the axle casing A is a ring of teeth 13, the teeth being formed on the outer face of a disk 14, and held normally away from the bottom of the hollow cone by an expansive spring 15 so that the tendency of the teeth is to engage those numbered 3 within the drum 1. This tendency is constantly resisted by a pair of rods or wires 16 leading from the disk 14 through holes 17 in the bottom of the cone 11 above and below the yoke 4 as seen in Figure 2, and above and below the axle casing A, their inner ends being connected with bell-cranks 18 pivoted at 19 on the axle, and from whose other arms wires or rods 20 lead forward to levers or pedals within reach of the driver. When tension on these wires is relaxed, the spring 15 expands and the teeth 13 are thrown into engagement with the teeth 3, so that rotation of the latter is positively stopped and the tire must slide along the ground. This might be said to constitute a brake lock and when thrown into action it will cause the tires of the wheels to slide along the ground.

What might be called the emergency brake having greater power than the service brake and of course less than the brake lock is made up of the drum and the cone and the means for actuating the latter. Threaded through the arms of the yoke are two screws 21, each reduced and shouldered near its inner end at 22, extending thence through the bottom of the cone 11, and threaded at its inner extremity at 23 for the reception of a nut 24, while the outer end of each screw carries a lever 29. To eyes 28 at the extremities of the two levers is pivoted a link 27 from which a rod or wire 30 leads forward to a lever or pedal within reach of the operator. When this is actuated, the link moves forward and both screws are turned where they pass through the yoke, the result being that said shoulders 22 bear the bottom of the cone outward and cause it to slide along the axle casing A until its beveled face 12 contacts with the inner wall 2 of the drum 1, and the emergency brake is applied. When tension on the rod is released, the expansion of the spring 15 restores the parts to their normal position.

Thus it will be seen that we have supplied each wheel with three brakes. The service brake is a band contracted around the periphery of the drum by mechanism which is well known in this art. The emergency brake is, in effect, a cone clutch where the female member is the inner wall of the drum and the male member the cone slidably mounted on the axle casing. And the brake lock is made up of two toothed rings which are permitted to engage each other by relaxing tension on the rods 20 only in times of great emergency or imminent accident. Yet it is obvious that at any time the wheel can be removed from the end of the spindle S without disarranging the several elements of the brake in the least and repairs may be made to the inside of the drum and cone and to all parts because of their ready accessibility.

A striking feature of our invention consists in facing the teeth 3 and 13 in such direction that when they are engaged they will lock the wheel against reverse rotation. Of course they might be so faced as to lock the wheel against turning forward, when the device serves in the nature of a positive brake. But when they lock the wheel against a reverse movement, the result is as follows: Assuming that the driver is ascending a hill and through an accident to some portion of the machinery, his progress ceases and his machine begins to run backward down the hill. He has but to release tension on the rod or rods 20, when the teeth 3 and 13 engage each other and the wheels become locked. Now the machine cannot run backward, and yet when he is ready to start on again, he can start his engine, throw in his clutch, and move ahead up the hill without the necessity for disengaging the teeth to permit such movement. Conversely, when the device is used to lock the wheel against forward rotation, it is possible for him to back his machine without unlocking the same; but this is rarely desirable, and the use of the invention suggested just above is in our opinion extremely important and valuable. It is quite obvious that the invention is capable of either use, according as the ratchet teeth are faced.

The foregoing description and the drawings have reference to what may be considered the preferred, or approved form of our invention. It is to be understood that we may make such changes in construction and arrangement and combination of parts, materials, dimensions, et cetera, as may prove expedient and fall within the scope of the appended claims.

Having thus fully described our invention, what we claim as new and useful and desire to secure by Letters Patent is:—

1. In a brake mechanism for automobiles, the combination with a driving wheel and friction means adapted to control rotation thereof in either direction, of means adapted to positively lock the wheel from rotation in one direction only including a ring of ratchet teeth supported to turn with the wheel and a member mounted on a relatively stationary part of the automobile and movable to and from a position when it will engage said teeth connected to the wheel, means acting constantly to effect engagement of the lock member and teeth, and means releasable at will for normally holding said lock member from engagement with said teeth.

2. In a brake for automobile wheels, the combination with a brake drum fast on a driving wheel hub, a fixed axle casing, and an axle spindle rotating therein; of means adapted to coact frictionally with the drum, a ring of ratchet teeth secured to said drum, a non-rotatable disk movably mounted on the axle casing and having a second ring of ratchet teeth adapted to engage those on the drum to positively prevent rotation of the drum and wheel in one direction only, means acting constantly to effect engagement of said disk and ring of teeth, and means controllable at will for permitting movement of said disk to effect engagement between said rings of ratchet teeth.

3. In an automobile brake, the combination of a drum fast on a wheel hub and having its inner wall tapering toward the wheel, a fixed axle casing, an axle spindle rotating therein and secured to the wheel hub; a yoke fast on said axle casing, a brake element slidably mounted on the axle casing outside the yoke and having a conical periphery adapted to fit within the rim of the drum, two screws engaging threaded openings through said yoke and having their outer ends secured to the bottom of the cone, levers fast on the ends of the screws inside the yoke, a link connecting the outer ends of said levers, a rod leading from said link to a point of manual control, and means adapted to positively prevent turning of said drum in one direction only, for the purpose described.

4. In a brake, the combination of a fixed axle casing, a rotating shaft therein, a wheel fast on the shaft, a brake drum fast on the wheel hub, means cooperating with the drum to control rotation of the wheel, teeth fast to the drum; a disk slidably mounted on the axle casing and having teeth adapted to engage those on the drum for locking the wheel against rotation in one direction only, a spring acting constantly to move said disk toward the drum, and manually operable restraining means for holding the teeth on the disk against coaction with those on the drum.

5. In a brake, the combination of a fixed axle casing, a rotating shaft therein, a wheel fast on the shaft, a drum fast on the wheel hub and having the inner face of its peripheral wall tapering toward the wheel, teeth fast in the bottom of the drum, a hollow cone brake slidably mounted on the casing and adapted to coact with the inner face of the rim of the drum, a disk slidably mounted on the casing within the cone and having teeth adapted to coact with those within the drum, a spring between the bottom of the cone and the disk forcing them normally apart, and separately operable manual controls for the brake cone and disk.

6. In a brake, the combination of a fixed axle casing, a rotating shaft therein, a wheel fast on the shaft, a drum fast on the wheel hub and having the inner surface of its peripheral wall tapering toward the wheel, teeth fast in the bottom of the drum, a cone brake slidably mounted on the casing and adapted to coact with the inner face of the rim of the drum, a disk slidably mounted on the casing within the cone and having teeth adapted to coact with those within the drum, a spring between the bottom of the cone and the disk forcing them normally apart, a yoke fast on the axle, screws extending through the yoke and engaging the bottom of said cone, manually operable means for turning said screws in unison, and manually controlled means to move said disk in opposition to the spring to control the action of the toothed brake.

7. In a brake mechanism for automobiles, the combination with a driving wheel and a friction brake including axially movable separable members mounted, respectively, on the wheel hub and a stationary support, of a lock arranged between the members of said brake and comprising a member fixed to the wheel and a non-rotatable member movable to and from engagement with said wheel member, means acting to constantly effect engagement between said lock members, and a manually controlled means for effecting separation of said lock members.

In testimony whereof we affix our signatures in presence of two witnesses.

JOHN R. STEELE.
JAMES R. STANGER.

Witnesses:
LEVI J. HAWKLEY,
J. L. BRANDORN.